United States Patent
Kimura et al.

(10) Patent No.: US 7,623,434 B2
(45) Date of Patent: Nov. 24, 2009

(54) OBJECTIVE LENS, OPTICAL PICKUP APPARATUS AND OPTICAL DISC DRIVING APPARATUS

(75) Inventors: Tohru Kimura, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 583 days.

(21) Appl. No.: 11/258,280

(22) Filed: Oct. 26, 2005

(65) Prior Publication Data

US 2006/0092815 A1     May 4, 2006

(30) Foreign Application Priority Data

Oct. 29, 2004   (JP)   ............... 2004-316778

(51) Int. Cl.
    *G11B 7/00*   (2006.01)
(52) U.S. Cl. ................................. 369/112.08
(58) Field of Classification Search ........................ None
    See application file for complete search history.

(56) References Cited

U.S. PATENT DOCUMENTS

| | | | |
|---|---|---|---|
| 6,791,932 B1 * | 9/2004 | Maruyama | 369/112.05 |
| 7,038,862 B2 * | 5/2006 | Maruyama et al. | 359/719 |
| 7,102,980 B2 * | 9/2006 | Saito et al. | 369/112.07 |
| 7,200,079 B2 * | 4/2007 | Ikenaka et al. | 369/44.37 |
| 7,239,598 B2 * | 7/2007 | Maruyama et al. | 369/112.23 |
| 2004/0047269 A1 | 3/2004 | Ikenaka et al. | |
| 2004/0100703 A1 * | 5/2004 | Kimura et al. | 359/719 |
| 2004/0246873 A1 | 12/2004 | Maruyama et al. | |
| 2005/0036430 A1 | 2/2005 | Ikenaka | |

FOREIGN PATENT DOCUMENTS

EP     1 445 768 A1     8/2004

OTHER PUBLICATIONS

European Search Report dated Nov. 6, 2008.

* cited by examiner

*Primary Examiner*—Joseph H Feild
*Assistant Examiner*—Joseph Haley
(74) *Attorney, Agent, or Firm*—Finnegan, Henderson, Farabow, Garrett & Dunner, L.L.P.

(57) ABSTRACT

An objective optical lens for use in an optical pickup apparatus, includes: an optical surface divided into at least two areas including: a central area including a first diffractive structure; and a peripheral area including a second diffractive structure, the objective lens is a single lens and is commonly used for the first to third optical information recording media, the objective lens converges diffracted light fluxes with same diffraction order generated in the first diffractive structure onto information recording surfaces of the first to third optical information recording media, respectively, the objective lens converges diffracted light fluxes with different diffraction order generated in the second diffractive structure onto information recording surfaces of the first and second optical information recording media, respectively.

19 Claims, 2 Drawing Sheets

OBJECTIVE LENS, OPTICAL PICKUP APPARATUS AND OPTICAL DISC DRIVING APPARATUS

This application is based on Japanese Patent Application No. 2004-316778 filed on Oct. 29, 2004, in Japanese Patent Office, which is hereby incorporated by reference.

FIELD OF THE INVENTION

The present invention relates to an objective lens used in an optical pickup apparatus capable of conducting recording and/or reproducing of information compatibly for different types of optical information recording media, an optical pickup apparatus employing the objective lens and to an optical disc driving apparatus.

BACKGROUND OF THE INVENTION

In the field of the optical pickup apparatus, a wavelength of a laser light source used as a light source for reproducing information recorded on an optical disc, and for recording of information on an optical disc, has been shortened in recent years, and laser light sources each having a wavelength of 400-420 nm such as, for example, a violet semiconductor laser and a blue SHG laser wherein a wavelength of an infrared semiconductor laser is converted by the use of a second harmonic are being put to practical use. If these violet laser light sources are used, information of 15-20 GB can be recorded on an optical disc with a diameter of 12 cm, when an objective lens having numerical aperture (NA) identical to that of DVD (digital versatile disc) is used, and information of 23-25 GB can be recorded on an optical disc with a diameter of 12 cm, when NA of the objective lens is raised up to 0.85. Hereafter, an optical disc and a magneto-optical disc both using a violet laser light source are generically called "high density optical disc", in the present specifications.

Incidentally, in the case of the high density optical disc using an objective lens with NA 0.85, an amount of comatic aberration generated by a skew of an optical disc is increased, and therefore, there are some optical discs wherein a protective substrate is designed to be thinner than that in DVD (0.1 mm for the thickness 0.6 mm in DVD) and an amount of comatic aberration caused by skew is reduced. Meanwhile, capability of only conducting recording and reproducing of information properly for the high density optical disc of this kind is not sufficient in terms of value as a product of an optical disc player and recorder. In view of the fact that DVD and CD (compact disc) in which various pieces of information are recorded are on the market presently, capability of only conducting recording and reproducing of information for the high density optical disc is not sufficient. For example, capability of conducting recording and reproducing of information properly even for DVD and CD owned by a user leads to enhancement of a commercial value as an optical disc player and recorder for the high density optical disc. From this background, it is desired that an optical pickup apparatus mounted on an optical disc player and recorder for a high density optical disc has capability for conducting recording and reproducing of information properly while maintaining compatibility for the high density optical disc and DVD, and further, compatibility for the high density optical disc and CD.

As a method to conduct recording and reproducing of information properly while maintaining compatibility between a high density optical disc and DVD, and further compatibility between a high density optical disc and CD, there is considered a method to switch selectively between an optical system for a high density optical disc and an optical system for DVD or CD depending on recording density of an optical disc for which recording and reproducing of information is conducted. However, this method is disadvantageous for downsizing of a device and for cost reduction, because a plurality of optical systems are needed.

Therefore, for the purpose of simplification of the structure of the optical pickup apparatus and of cost reduction, it is preferable to reduce the number of optical parts constituting the optical pickup apparatus to the utmost, by making an optical system for a high density optical disc and optical systems for DVD and CD to be common, even in the case of the optical pickup apparatus having compatibility. What is most advantageous for simplification of the structure of the optical pickup apparatus and for cost reduction is to make objective lenses each being arranged to face an optical disc to be common and to make this objective lens to be of the single lens structure. Incidentally, to obtain an objective lens which is compatible for optical discs of plural types each being different from others in terms of a wavelength for recording and reproducing, it is necessary to form a phase structure having wavelength dependency of spherical aberration.

Now, Patent Document 1 discloses an objective lens that is the single lens structure and is capable of conducting recording and/or reproducing of information for a high density optical disc, DVD and CD on a compatible basis.

(Patent Document 1) TOKKAI No. 2004-79146

In the technology disclosed by the Patent Document 1, diffraction efficiency is enhanced for a light flux emitted from an infrared laser light source for blue and DVD (hereinafter referred to as "red") and for a light flux emitted from an infrared laser light source for CD (hereinafter referred to as "infrared" by utilizing even-order-numbered diffracted light for a light flux emitted from a violet laser light source for a high density optical disc (hereinafter referred to as "blue"). However, a diffraction angle that is determined by "diffraction order number×wavelength" becomes substantially the same for blue and infrared because a wavelength ratio of blue to infrared is about 2:1, and compatibility between a high density disc and CD is difficult to be achieved in diffraction operations. Therefore, in the objective lens in the prior art, compatibly for both a high density optical disc and CD is achieved by causing "infrared" to enter as divergent light. However, this method for compatibility has a problem that an amount of generation of comatic aberration is large when the objective lens is subjected to tracking driving in the case of using CD, and it is not practical.

SUMMARY OF THE INVENTION

The invention is achieved in view of the problems mentioned above, to provide an objective lens having a diffractive structure, being a single-group structure, and being capable of conducting recording and/or reproducing of information properly for three types of discs each having a different recording density, including a high density optical disc using a violet laser light source, DVD and CD; an optical pickup apparatus employing that objective lens; and an optical disc driving apparatus, and in particular, an objective lens such that an amount of generation of comatic aberration amount generated when the objective lens is driven to tracking for using CD is sufficiently small.

In the present specification, optical discs using a violet semiconductor laser or a violet SHG laser as a light source for conducting recording and reproducing of information (which are also called optical information recording media) are generically called a "high density optical disc", and the high density optical disc includes also an optical disc (for example, HD DVD: hereinafter abbreviated as HD) that conducts recording and reproducing of information by an objective optical system having NA of 0.85 and conducts recording and reproducing of information by an objective optical system having NA of 0.65-0.67, and has a standard that a thickness of a protective substrate is about 0.6 mm. Further, in addition to the optical disc having, on its information recording surface, the protective substrate, an optical disc having, on its information recording surface, a protective film having a thickness of about several—several tens nanometers and an optical disc having a protective substrate or a protective film whose thickness is zero, are also included in the high density optical disc. Further, in the present specification, the high density optical disc includes a magneto-optical disc that uses a violet semiconductor laser or a violet SHG laser as a light source for conducting recording and reproducing of information.

Further, in the present specification, DVD is a generic name of optical discs of DVD series such as DVD-ROM, DVD-Video, DVD-Audio, DVD-RAM, DVD-R, DVD-RW, DVD+R and DVD+RW, and CD is a generic name of optical discs of CD series such as CD-ROM, CD-Audio, CD-Video, CD-R and CD-RW. With respect to recording density, that of the high density optical disc is the highest, and it becomes lower in the order of DVD and CD.

The optical pickup apparatus described in Item 1, is an objective optical lens for use in an optical pickup apparatus. The optical pickup apparatus is provided for recording and/or reproducing information by converging a first light flux with a wavelength $\lambda 1$ ($\lambda 1 < 450$ nm) emitted by a first light source on an information recording surface of a first optical information recording medium through a first protective substrate with a thickness t1. The optical pickup apparatus is further provided for recording and/or reproducing information by converging a second light flux with a wavelength $\lambda 2$ ($1.5 \times \lambda 1 < \lambda 2 < 1.7 \times \lambda 1$) emitted by a second light source on an information recording surface of a second optical information recording medium through a second protective substrate with a thickness t2 ($t1 \leq t2$). The optical pickup apparatus is further provided for recording and/or reproducing information by converging a third light flux ($1.9 \times \lambda 1 < \lambda 3 < 2.1 \times \lambda 1$) emitted by the third light source on an information recording surface of a third optical information recording medium through a third protective substrate with a thickness t3 ($t2 < t3$). The objective optical lens is provided with: an optical surface divided into at least two areas including: a central area including an optical axis and comprising a first diffractive structure; and a peripheral area surrounding the central area and comprising a second diffractive structure. The objective lens is a single lens and is commonly used for the first to third optical information recording media. The objective lens converges diffracted light fluxes of the first to third light fluxes generated in the first diffractive structure onto information recording surfaces of the first to third optical information recording media, respectively. The diffracted light fluxes of the first to third light fluxes generated in the first diffractive structure have same diffraction order each other. The objective lens converges diffracted light fluxes of the first and second light fluxes generated in the second diffractive structure onto information recording surfaces of the first and second optical information recording media, respectively. The diffracted light fluxes of the first and second light fluxes generated in the second diffractive structure have different diffraction order each other.

In the objective lens relating to the invention, a diffractive structure that generates diffracted light with the same diffraction order number for three different wavelengths (for example, blue, red and infrared) is formed on the central area corresponding to the inside of the numerical aperture of the third optical information recording medium (for example, CD), and thereby, an appropriate light-converging spot is formed on an information recording surface so that recording and/or reproducing of information may be carried out for both of the first optical information recording medium (for example, high density optical disc) and the third optical information recording medium (for example, CD) on a compatible basis. If the diffracted light having the same order number is utilized, there is caused a difference of a diffraction angle between a light flux with wavelength $\lambda 1$ and a light flux with wavelength $\lambda 3$, whereby, a magnification of the objective lens in the case of using the third optical information recording medium does not become too small, and an amount of generation of comatic aberration in the case of tracking driving can be reduced.

Meanwhile, in the objective lens according to the present invention, the number of areas is not limited to two, and the central area may also be divided into plural areas, or the peripheral area may also be divided into plural areas. The number of areas may be changed properly, so that recording and reproducing characteristics may become optimum for each optical information recording medium. For example, when designing an objective lens having compatibility for BD, HD, DVD and CD, it is preferable to divide into four areas including an area corresponding to the inside of the numerical aperture of CD, an area corresponding to a range from the numerical aperture of CD to the numerical aperture of DVD, an area corresponding to a range from the numerical aperture of DVD to the numerical aperture of HD, and an area corresponding to a range from the numerical aperture of HD to the numerical aperture of BD.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DETAILED DESCRIPTION OF THE INVENTION

Figure 1:
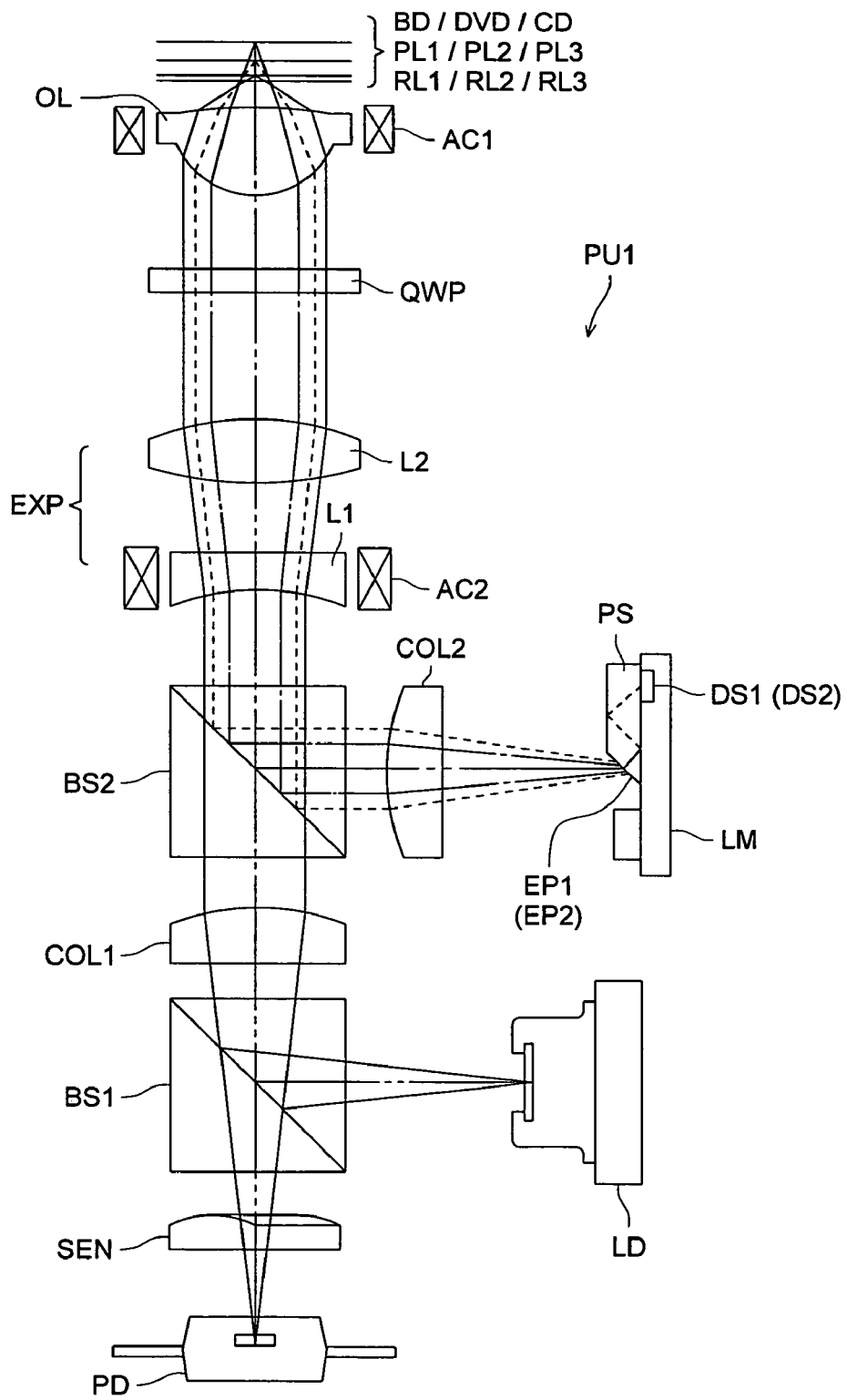
FIG. 1 is a diagram showing schematically the structure of optical pickup apparatus PU1.

A preferred embodiment of the invention will be explained as follows.

In the structure described in Item 2, according to the objective lens described in Item 1, the objective lens satisfies the following expression, where $\eta 11$ represents a diffraction efficiency of the first light flux in the central area and $\eta 21$ represents a diffraction efficiency of the first light flux in the peripheral area.

$$\eta 11 \leq \eta 21 \qquad (1)$$

Since the diffraction efficiency is dependent on a depth of a ring-shaped zone in the diffractive structure, it is possible to establish a diffraction efficiency properly for each wavelength in the central area, depending on a use of an optical pickup apparatus on which the objective lens of the invention is mounted. For example, in the case of an optical pickup apparatus that conducts information recording and/or reproducing for the first optical information recording medium (e.g., a high density optical disc) and conducts only information reproducing for the second and third optical information recording media (e.g., DVD and CD), it is preferable that the diffractive structure is designed to provide the diffraction efficiency in the central area with a great importance to a light flux with wavelength $\lambda 1$ (e.g., blue). On the other hand, when conducting only information reproducing for the first optical information recording medium (e.g., a high density optical disc) and conducting information recording and/or reproducing for the second and third optical information recording media (e.g., DVD and CD), it is preferable that the diffractive structure is designed to provide the diffraction efficiency in the central area with a great importance to light fluxes respectively with wavelength $\lambda 2$ and $\lambda 3$ (e.g., red, infrared).

In either case, it is possible to secure the diffraction efficiency of the light flux with wavelength $\lambda 1$ (e.g., blue) calculated by area-weighted average of each area to be high, by designing an objective lens so that the conditional expression (1) may be satisfied. Incidentally, when the diffractive structure is designed to provide the diffraction efficiency in the central area with a great importance to light fluxes respectively with wavelength $\lambda 2$ and $\lambda 3$ (e.g., red, infrared), a decline of the diffraction efficiency for the central area is not affected so much if the total effective diameter of the light flux with wavelength $\lambda 1$ (e.g., blue) is considered. Although the diffraction efficiency of the light flux with wavelength $\lambda 1$ (e.g., blue) in the same area is declined, because the numerical aperture of the first optical information recording medium (e.g., a high density optical disc) is greater than that of the third optical information recording medium (e.g., CD).

Further, the second diffractive structure that generates, with light fluxes respectively with wavelengths $\lambda 1$ and $\lambda 2$ (e.g., blue and red), diffracted light fluxes each having a different diffraction order number, is formed on a peripheral area, namely on an area other than the central area corresponding to the inside of the numerical aperture of the third optical information recording medium (e.g., CD). Therefore, it allows to achieve compatibility for the first optical information recording medium and second optical information recording medium (e.g., a high density optical disc and DVD) while securing the high diffraction efficiency for the light fluxes respectively with wavelengths $\lambda 1$ and $\lambda 2$ (e.g., blue and red).

Incidentally, the diffraction efficiency mentioned in the present specification can be defined as follows.

(1) Transmittances of an objective lens each being formed with the same material and having the same focal length, the same lens thickness and the same numerical aperture to the objective lens according to the present invention and further having neither the first diffractive structure nor the second diffractive structure, are measured for the central area and the peripheral area. In this case, the transmittance for the central area is measured by intercepting the light flux entering the peripheral area, and the transmittance for the peripheral area is measured by intercepting the light flux entering the central area.

(2) The transmittances of the objective lens according to the invention are measured for the central area and the peripheral area.

(3) A value obtained by dividing the results of the above item (2) by the results of the above item (1) is made to be the diffraction efficiency of each area.

The objective lens described in Item 3 is represented by the structure according to Item 1 wherein the same diffraction order of the diffracted light fluxes of the first to third light fluxes generated in the first diffractive structure is 1.

If the diffraction order number for the central area is made to be 1, a range of the selection of a depth of a ring-shaped zone in the case of setting the diffraction efficiency for each wavelength of the central area grows greater, and an objective lens that can be applied to optical pickup apparatus for various uses can be provided.

The objective lens described in Item 4 is represented by the structure according to Item 3 wherein a blaze wavelength of the first diffractive structure is a wavelength between the first wavelength $\lambda 1$ and the second wavelength $\lambda 2$.

When the diffraction order number of the central area is 1, if the blaze wavelength is made to be between the first wavelength $\lambda 1$ and the second wavelength $\lambda 2$, the diffraction efficiency for each wavelength corresponding to a use of the optical pickup apparatus can be established.

The objective lens described in Item 5 is represented by the structure according to any one of Item 1-Item 4 wherein diffracting power of the first diffractive structure is negative.

If the diffracting power of the first diffractive structure is made to be negative, spherical aberration caused by a thickness difference between protective substrate and spherical aberration caused by a wavelength difference can be corrected satisfactorily.

The objective lens described in Item 6 is represented by the structure according to Item 1 wherein the diffraction orders of the diffracted light fluxes of the first and second light fluxes generated in the second diffractive structure are 2 for the first light flux and 1 for the second light flux.

If the diffraction order number of the second diffractive structure is made to be second order for the light flux with the wavelength $\lambda 1$ (e.g., blue), and to be first order for the light flux with the wavelength $\lambda 2$ (e.g., red), a maximum difference in diffraction angles can be taken while securing the diffraction efficiency for each wavelength. Thereby, compatibility at a large pitch can be secured, and a loss of the diffraction efficiency caused by formal errors of the diffractive structure can be reduced.

The objective lens described in Item 7 is represented by the structure according to Item 6 wherein a blaze wavelength of the second diffractive structure is smaller than the first wavelength $\lambda 1$.

To make the diffraction efficiency of the second diffractive structure for the light flux with wavelength $\lambda 1$ (e.g., blue) to be compatible with the diffraction efficiency of the second diffractive structure for the light flux with wavelength $\lambda 2$ (e.g., red), it is preferable that the blaze wavelength is made to be smaller than the first wavelength $\lambda 1$.

The objective lens described in Item 8 is represented by the structure according to Item 1, wherein the second diffractive structure is a wavelength selective diffractive structure comprising a plurality of patterns arranged concentrically. Each of the plurality of patterns has a cross section including an optical axis in a stepped shape with a plurality of levels. Each step of the stepped shape is shifted by height of steps corresponding to a predefined number of the plurality of levels for every predefined number of the levels. The diffraction orders of the diffracted light fluxes of the first and second light fluxes generated in the second diffractive structure are 0 for the first light flux and 1 for the second light flux.

When the diffractive structure of a wavelength selective type with diffractive actions described in Item 8 is used as the second diffractive structure, spherical aberration for the second light flux can be corrected satisfactorily, because a phase of the second light flux can be controlled independently, which results in offering of the objective lens that is excellent in characteristics of recording and reproducing for the second optical information recording medium.

The "diffractive structure of a wavelength selective type" means a diffractive structure in which steps in the prescribed number are formed in each blaze, and a cross-sectional shape including an optical axis of each blaze is made to be in a form of stairs. When light fluxes which are different each other in terms of a wavelength are represented respectively by A and B, it is possible to give diffractive actions having wavelength-selectivity to diffract light flux B without diffracting light flux A, by making an optical path difference to be added by a difference in levels formed in each blaze to be an integer multiple of a wavelength of light flux A for the light flux A, and by setting properly the number of steps in each blaze. Meanwhile, the number of steps in a form of stairs, a height of a staircase and a width can be designed properly depending on an amount of spherical aberration to be corrected and on a wavelength. To be concrete, it is disclosed in TOKKAIHEI No. 9-306018.

The objective lens described in Item 9 is represented by the structure according to Item 8, wherein one step of the plurality of patterns in the second diffractive structure provides an optical path difference to the first light flux with the first wavelength $\lambda 1$, and the optical path difference is twice of the first wavelength $\lambda 1$. Thereby, it is possible to secure high diffraction efficiency (transmittance) for light fluxes with all wavelengths, by setting a step equivalent to one of the diffractive structure of a wavelength-selective type to the depth corresponding to double of the first wavelength $\lambda 1$ in conversion of an optical path difference.

The objective lens described in Item 10 is represented by the structure according to Item 8 or Item 9 wherein the predetermined number of levels in the second diffractive structure is either of 4, 5 and 6. In the diffractive structure of a wavelength-selective type, diffraction efficiency of the light flux subjected to diffracting actions is dependent not only on a step equivalent to one of the patterns but also on the number of levels. The diffraction efficiency of the second light flux can be secured to be high, by setting this number of levels to either one of 4, 5 and 6. It is preferable to set the number of levels to 5 to make the diffraction efficiency of the second light flux to be maximum.

The objective lens described in Item 11 is represented by the structure according to any one of Items 1-10, wherein the peripheral area is divided into at least two areas including: a first peripheral area surrounding the central area and including the second diffractive structure; and a second peripheral area surrounding the first peripheral area and formed by an aspherical surface without the second diffractive structure.

In the objective lens, if a diffractive structure is formed on the area for exclusive use which transmits only the light flux used for the first optical information recording medium (e.g., a high density optical disc), a loss of transmittance caused by shading (vignetting of the light flux caused by a step of ring-shaped zone) is generated, because the aspheric surface is generally tilted greatly. If this area is made to be an aspheric surface where no diffractive structure is formed, transmittance of the light flux with wavelength $\lambda 1$ (e.g., blue) can be enhanced.

The objective lens described in Item 12 is represented by the structure according to any one of Items 1-11, further includes a third diffractive structure. The objective lens converges a 10th diffracted light flux among diffracted light fluxes of the first light flux generated by the third diffractive structure on the information recording surface of the first optical information recording medium. The objective lens further converges a 6th diffracted light flux among diffracted light fluxes of the second light flux generated by the third diffractive structure on the information recording surface of the second optical information recording medium. The objective lens further converges a 5th diffracted light flux among diffracted light fluxes of the third light flux generated by the third diffractive structure on the information recording surface of the third optical information recording medium.

As the diffraction order number of the third diffractive structure, when the $10^{th}$ order number is used for the light flux with wavelength $\lambda 1$ (e.g., blue), the $6^{th}$ order number is used for the light flux with wavelength $\lambda 2$ (e.g., red), and the $5^{th}$ order number is used for the light flux with wavelength $\lambda 3$ (e.g., infrared), diffraction angles of respective light fluxes can be made equal each other. Thereby, compensation can be made for deterioration of light-converging characteristics caused by minute wavelength changes in a wavelength area of each light flux and by temperature changes, without influencing spherical aberration correcting characteristics by the first and second diffractive structures.

The objective lens described in Item 13 is represented by the structure according to Item 12, wherein the third diffractive structure compensates a deterioration of a paraxial image point position of the first light flux with a wavelength $\lambda 1$ caused by a wavelength change of the first light flux in a range of ±5 nm.

A trend toward the shorter wavelength for recording and reproducing makes chromatic aberration to grow, which enlarges fluctuations in paraxial image point position caused by mode-hop of a semiconductor laser light source. Therefore, it is necessary to correct chromatic aberration in an optical system of an optical pickup for a high density optical disc. An objective lens excellent in recording and reproducing characteristics can be provided by correcting chromatic aberration by the actions of the third diffractive structure.

The objective lens described in Item 14 is represented by the structure according to Item 12, wherein the third diffractive structure compensates a deterioration of a spherical aberration of the first light flux with the wavelength $\lambda 1$ caused by a wavelength change of the first light flux in a range of ±5 nm.

When the numerical aperture of the objective lens is made to be higher, a fluctuation of spherical aberration caused by minute wavelength changes shows its amount which cannot be ignored. If this spherical aberration fluctuation is not compensated by the optical system of an optical pickup, a semiconductor laser light source needs to be selected, resulting in a cost increase of the optical pickup apparatus. An objective lens having a broad area for usable wavelengths can be provided, by correcting this spherical aberration by the actions of the third diffractive structure.

The objective lens described in Item 15 is represented by the structure according to Item 12, wherein the third diffractive structure compensates a deterioration of a spherical aberration of the first light flux with the wavelength $\lambda 1$ caused by a temperature change in a range of ±30° C.

When the numerical aperture of the objective lens is made to be higher, a fluctuation of spherical aberration caused by temperature changes shows its amount which cannot be ignored. The fluctuation of spherical aberration of this kind becomes a problem especially when the objective lens is made of resin. By correcting this fluctuation of spherical aberration by the actions of the third diffractive structure, an objective lens having a broad range of usable temperatures can be provided.

The objective lens described in Item 16 is represented by the structure according to any one of Items 1-15 wherein the objective lens is made of resin. By using resin for the objective lens, objective lenses which are stable in ability and are inexpensive in cost can be manufactured on a mass production basis, power consumption of an actuator for focusing drive and tracking drive is less because of light weight, and an actuator can be downsized. It is further possible to transfer the diffractive structure satisfactorily through molding, because viscosity in the state of meltdown is low. It is further preferable that antioxidant is added to resin, whereby light stability for blue can be improved.

The objective lens described in Item 17 is represented by the structure according to Item 16, wherein microparticles having a diameter of 30 nm or less and having a refractive index change rate caused by a temperature change with an opposite sign to a sigh of the resin, the objective lens is made of resin, are dispersed in to the resin.

As a material wherein particles each being 30 nm or less in terms of size are dispersed in resin representing a base material, there is known athermal resin. Compared with resin for ordinary optical use, athermal resin has characteristics that a change of refractive index caused by temperature changes is small, and therefore, it is possible to make an effect of improving temperature characteristic by the diffractive structure to be moderate, and thereby, it is possible to reduce deterioration of wavelength characteristic caused by the diffractive structure, to broaden the degree of freedom for the design of an optical element, and to expand manufacturing errors and a permissible range for assembling accuracy.

In general, when particles is mixed with transparent resin material, scattering of light is generated and transmittance is declined, which has made it difficult to use the resin material. However, it has been understood that the scattering does not appear substantially if fine particles are made to be fine particles whose average particle size that is smaller than a wavelength of the transmitted light flux is not more than 30 nm.

It is possible to obtain a material that has a small change rate of refractive index caused by temperature changes while having the same moldability as that of resin, by dispersing particles having a sign of a refractive index change rate caused by temperature changes is opposite to that of the aforesaid resin, and a diameter is not more than 30 nm. By forming objective lenses of the invention using the aforesaid material, it is possible to provide objective lenses which can be manufactured on a mass production basis stably through molding and at a lower cost and have a small fluctuation of spherical aberration caused by temperature changes and have a high numerical aperture, while the objective lenses can be mass-produced with stable ability by molding and with inexpensive in cost. In this case, it is preferable that the resin stated above satisfies the following condition;

$$|A| < 8 \times 10^{-5}$$

where, A represents a value shown with the following expression;

$$A = \frac{(n^2 + 2)(n^2 - 1)}{6n} \left\{ (-3\alpha) + \frac{1}{[R]} \frac{\partial [R]}{\partial t} \right\} \quad \text{(Numeral 4)}$$

α represents the thermal expansion coefficient and [R] represents the molecular refraction. (4)

A change in the refractive index caused by temperature changes is expressed by the expression 4 above, by differentiating refractive index n with temperature t, based on Lorentz-Lorenz equation.

In the case of resin, contribution of the second term is smaller than the first term in general, and it can be ignored substantially. For example, in the case of PMMA resin, linear expansion coefficient α is $7 \times 10^{-5}$, and when this is substituted in the expression above, $-1.2 \times 10^{-4}$ is obtained, and this agrees substantially with the actual measurement.

In the objective lens described in Item 17, contribution of the second term in the expression above is made to grow greater substantially, by dispersing microparticles, preferably, inorganic microparticles in the resin, so that the contribution of the second term and changes by linear expansion of the first term may cancel each other.

For example, the sign of a change rate of refractive index caused by temperature changes is opposite to that of the aforesaid resin, and the microparticles whose diameters are not more than 30 nm are dispersed in the resin. It allows obtaining a material that has a small rate of a change of refractive index caused by temperature changes while having the same moldability as that of resin.

In general, dn/dT of thermoplastic resin has a negative value, namely, a refractive index becomes smaller as a temperature rises. Therefore, it is preferable to disperse microparticles having large dn/dT, for making |dn/dT| of thermoplastic resin composition to be small efficiently. Large refractive index change rate of dn/dT means that, when a refractive index change rate of resin representing a base material has a negative sine, microparticles have a negative refractive index change rate closer to zero than the foregoing refractive index change rate, or have a positive refractive index change rate.

By dispersing these kinds of microparticles into the thermoplastic resin, |dn/dT| of thermoplastic resin composition can effectively become small with less amount of the fine particles.

Specifically, it is preferable that the dn/dT which has been about $-1.2 \times 10^{-4}$ is restrained to be less than $10 \times 10^{-5}$ in an absolute value. Restraining to be less than $8 \times 10^{-5}$ preferably, and to be less than $6 \times 10^{-5}$ more preferably is preferable for optical design or for an optical element.

It is also possible to make the material to have temperature characteristics which are opposite to those of the initial resin, by enlarging the contribution of the second term. In other words, a material whose refractive index is enhanced without being declined when a temperature rises, can also be obtained.

Particles to be dispersed in resin are preferably of inorganic material. It is preferable that this inorganic material is an oxide, and it is most preferable that this oxide is in the state of saturated oxidation. If the oxide is in the state of saturated oxidation, progress of oxidation actions causing deterioration of transmittance in the case of irradiation of blue light and of wavefront aberration can be prevented.

Being an inorganic matter is preferable because reaction between the inorganic matter and resin to become a base material representing high molecular organic compound is restrained to be low, and being an oxide can prevent deterioration caused by actual use such as irradiation of laser beam. In particular, under the severe conditions such as high temperature and irradiation of a laser beam, oxidation of resin tends to be accelerated. However, fine particles of this inorganic oxide can prevent deterioration caused by oxidation.

Further, it is naturally possible to add antioxidants in resin material to prevent oxidation of resin caused by other factors.

Though it is possible to select properly dn/dT of microparticles to be dispersed, by a value of dn/dT of thermoplastic resin to become a base material, it is preferable that dn/dT of microparticles is greater than $-20 \times 10^{-6}$ and it is more preferable that dn/dT of microparticles is greater than $-10 \times 10^{-6}$.

Meanwhile, inorganic microparticles to be dispersed in thermoplastic resin are not limited in particular, and they can be selected optionally from inorganic microparticles provided that a rate of refractive index change caused by temperature of thermoplastic resin composition to be obtained is small. To be concrete, oxide microparticles, metal salt microparticles and semiconductor microparticles are preferably used, and it is preferable to use by selecting properly those wherein absorption, light emission and fluorescence are not generated in the wavelength area used as an optical element, from the aforesaid fine particles.

The following metal oxide is used for oxide microparticles used in the present invention: a metal oxide constructed by one or more kinds of metal selected by a group including Li, Na, Mg, Al, Si, K, Ca, Sc, Ti, V, Cr, Mn, Fe, Co, Ni, Cu, Zn, Rb, Sr, Y, Nb, Zr, Mo, Ag, Cd, In, Sn, Sb, Cs, Ba, La, Ta, Hf, W, Ir, Tl, Pb, Bi and rare earth metal. More specifically, for example: oxide such as silicon oxide, titanium oxide, zinc oxide, aluminum oxide, zirconium oxide, hafnium oxide, niobium oxide, tantalum oxide, magnesium oxide, calcium oxide, strontium oxide, barium oxide, indium oxide, tin oxide, lead oxide; complex oxide compounds thereof such as lithium niobate, potassium niobate and lithium tantalate, the aluminum magnesium oxide ($MgAl_2O_4$) are cited. Furthermore, rare earth oxides are used for the oxide microparticles in the present invention. More specifically, for example, scandium oxide, yttrium oxide, lanthanum trioxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide are cited. As metal salt microparticles, the carbonate, phosphate, sulfate, etc. are cited. More specifically, for example, calcium carbonate, aluminum phosphate are cited.

Moreover, semiconductor microparticles in the present invention mean the microparticles constructed by a semiconducting crystal. The semiconducting crystal composition examples include simple substances of the 14th group elements in the periodic table such as carbon, silica, germanium and tin; simple substances of the 15th group elements in the periodic table such as phosphor (black phosphor); simple substances of the 16th group elements in the periodic table such as selenium and tellurium; compounds comprising a plural number of the 14th group elements in the periodic table such as silicon carbide (SiC); compounds of an element of the 14th group in the periodic table and an element of the 16th group in the periodic table such as tin oxide (IV) ($SnO_2$), tin sulfide (II, IV) ($Sn(II)Sn(IV)S_3$), tin sulfide (IV) ($SnS_2$), tin sulfide (II) (SnS), tin selenide (II) (SnSe), tin telluride (II) (SnTe), lead sulfide (II) (PbS), lead selenide (II) (PbSe) and lead telluride (II) (PbTe); compounds of an element of the 13th group in the periodic table and an element of the 15th group in the periodic table (or III-V group compound semiconductors) such as boron nitride (BN), boron phosphide (BP), boron arsenide (BAs), aluminum nitride (AlN), aluminum phosphide (AlP), aluminum arsenide (AlAs), aluminu antimonide (AlSb), gallium nitride (GaN), gallium phosphide (GaP), gallium arsenide (GaAs), gallium antimonide (GaSb), indium nitride (InN), indium phophide (InP), indium arsenide (InAs) and indium antimonide (InSb); compounds of an element of the 13th group in the periodic table and an element of the 16th group in the periodic table such as aluminum sulfide ($Al_2S_3$), aluminum selenide ($Al_2Se_3$), gallium sulfide ($Ga_2S_3$), gallium selenide ($Ga_2Se_3$), gallium telluride ($Ga_2Te_3$), indium oxide ($In_2O_3$), indium sulfide ($In_2S_3$), indium selenide (InSe) and indium telluride ($In_2Te_3$); compounds of an element of the 12th group in the periodic table and an element of the 16th group in the periodic table (or II-VI group compound semiconductors) such as zinc oxide (ZnO), zinc sulfide (ZnS), zinc selenide (ZnSe), zinc telluride (ZnTe), cadmium oxide (CdO), cadmium sulfide (CdS), cadmium selenide (CdSe), cadmium telluride (CdTe), mercury sulfide (HgS), mercury selenide (HgSe) and mercury telluride (HgTe); compounds of an element of the 15th group in the periodic table and an element of the 16th group in the periodic table such as arsenic sulfide (III) ($As_2S_3$), arsenic selenide (III) ($As_2Se_3$), arsenic telluride (III) ($As_2Te_3$), antimony sulfide (III) ($Sb_2S_3$), antimony selenide (III) ($Sb_2Se_3$), antimony telluride (III) ($Sb_2Te_3$), bismuth sulfide (III) ($Bi_2S_3$), bismuth selenide (III) ($Bi_2Se_3$) and bismuth telluride (III) ($Bi_2Te_3$); compounds of an element of the 11th group in the periodic table and an element of the 16th group in the periodic table such as copper oxide (I) ($Cu_2O$) and copper selenide (I) ($Cu_2Se$); compounds of an element of the 11th group in the periodic table and an element of the 17th group in the periodic table such as copper chloride (I) (CuCl), copper bromide (I) (CuBr), copper iodide (I) (CuI), silver chloride (AgCl) and silver bromide (AgBr); compounds of an element of the 10th group in the periodic table and an element of the 16th group in the periodic table such as nickel oxide (II) (NiO); compounds of an element of the 9th group in the periodic table and an element of the 16th group in the periodic table such as cobalt oxide (II) (CoO) and cobalt sulfide (II) (CoS); compounds of an element of the 8th group in the periodic table and an element of the 16th group in the periodic table such as triiron tetraoxide ($Fe_3O_4$) and iron sulfide (II) (FeS); compounds of an element of the 7th group in the periodic table and an element of the 16th group in the periodic table such as manganese oxide (II) (MnO); compounds of an element of the 6th group in the periodic table and an element of the 16th group in the periodic table such as molybdenum sulfide (IV) ($MoS_2$) and tungsten oxide(IV) ($WO_2$); compounds of an element of the 5th group in the periodic table and an element of the 16th group in the periodic table such as vanadium oxide (II) (VO), vanadium oxide (IV) ($VO_2$) and tantalum oxide (V) ($Ta_2O_5$); compounds of an element of the 4th group in the periodic table and an element of the 16th group in the periodic table such as titanium oxide (such as $TiO_2$, $Ti_2O_5$, $Ti_2O_3$ and $Ti_5O_9$); compounds of an element of the 2th group in the periodic table and an element of the 16th group in the periodic table such as magnesium sulfide (MgS) and magnesium selenide (MgSe); chalcogen spinels such as cadmium oxide (II) chromium (III) ($CdCr_2O_4$), cadmium selenide (II) chromium (III) ($CdCr_2Se_4$), copper sulfide (II) chromium (III) ($CuCr_2S_4$) and mercury selenide (II) chromium (III) ($HgCr_2Se_4$); and barium titanate ($BaTiO_3$). Further, semiconductor clusters structures of which are established such as $Cu_{146}Se_{73}$(triethylphosphine)$_{22}$, described in Adv. Mater., vol. 4, p. 494 (1991) by G. Schmid, et al., are also listed as examples.

As microparticles having large dn/dT, gallium nitride, zinc sulfate, zinc oxide, lithium niobate and lithium tantalite, for example, are preferably used.

Incidentally, as resin to become a base material, resins disclosed in TOKKAI Nos. 2004-144951, 2004-144953 and 2004-144954 are preferably used.

On the other hand, when dispersing microparticles in thermoplastic resin, it is preferable that a difference of refractive index between the thermoplastic resin to become a base material and the microparticles is small. As a result of the studies of the inventors, it was found out that scattering is hardly caused when light is transmitted, if a difference of refractive index between the thermoplastic resin and the microparticles to be dispersed is small. It was found out that when dispersing microparticles in the thermoplastic resin, if a particle is larger, scattering in the case of transmittance of light tends to be generated, but if a difference of refractive index between the thermoplastic resin and the fine particles to be dispersed is small, a rate of occurrence of scattering of light is low even when relatively large fine particles are used. A difference of refractive index between the thermoplastic resin and the fine particles to be dispersed is preferably within a range of 0-0.3, and a range of 0-0.15 is more preferable.

Refractive indexes of thermoplastic resins used preferably as optical materials are about 1.4-1.6 in many cases, and as materials to be dispersed in these thermoplastic resins, silica (silicon oxide), calcium carbonate, aluminum phosphate, aluminum oxide, magnesium oxide and aluminum magnesium oxides, for example, are preferably used.

Further, studies made by the inventors have clarified that dn/dT of thermoplastic resin composition can be made small effectively, by dispersing fine particles whose refractive index is relatively low. As a reason why |dn/dT| of thermoplastic resin composition in which microparticles having low refractive index are dispersed becomes small, it is considered that temperature changes of the volume fraction of inorganic fine particles in the resin composition may work to make the |dn/dT| of the resin composition to become smaller when the refractive index of the microparticles is lower, although the details are not clarified. As microparticles having a relatively low refractive index, silica (silicon oxide), calcium carbonate and aluminum phosphate, for example, are preferably used.

It is difficult to improve simultaneously all of an effect of lowering dn/dT of the thermoplastic resin composition, light permeability and of a desired refractive index, and microparticles to be dispersed in the thermoplastic resin can be selected properly by considering a size of dn/dT of a fine particle itself, a difference of dn/dT between microparticles and the thermoplastic resin to become a base material, and the refractive index of the fine particles, depending on the characteristics which are required for the thermoplastic resin composition. Further, it is preferable, for maintaining light permeability, to use microparticles by selecting properly the affinity with the thermoplastic resin to become a base material, namely, dispersibility for the thermoplastic resin and fine particles which hardly cause light scattering.

For example, when using cyclic olefin polymer used for an optical element preferably as a base material, silica is preferably used as microparticles which make |dn/dT| small while keeping light permeability.

For the microparticles mentioned above, it is possible to use either one type of inorganic fine particles or plural types of inorganic fine particles in combination. By using plural types of microparticles each having a different characteristic, the required characteristics can further be improved efficiently.

A range of 1-30 nm for an average particle size is preferable for the inorganic microparticles-relating to the invention, a range of 1-20 nm is more preferable, and a range of 1-10 nm is further preferable. When the average particle size is less than 1 nm, dispersion of the inorganic microparticles is difficult, resulting in a fear that the required efficiency may not be obtained, therefore, it is preferable that the average particle size is 1 nm or more. When the average particle size exceeds 30 nm, thermoplastic material composition obtained becomes muddy and transparency is lowered, resulting in a fear that the light transmittance may become less than 7.0%, therefore, it is preferable that the average particle size is 30 nm or less. The average particle size mentioned here means volume average value of a diameter (particle size in conversion to sphere) in conversion from each particle into a sphere having the same volume as that of the particle.

Further, a form of an inorganic microparticle is not limited in particular, but a spherical fine particle is used favorably. To be concrete, a range of 0.5-1.0 for the ratio of the minimum size of the particle (minimum value of the distance between opposing two tangents each touching the outer circumference of the fine particle)/the maximum size (maximum value of the distance between opposing two tangents each touching the outer circumference of the microparticle) is preferable, and a range of 0.7-1.0 is mote preferable.

A distribution of particle sizes is not limited in particular, but a relatively narrow distribution is used suitably, rather than a broad distribution, for making the invention to exhibit its effect efficiently.

Mixing and dispersion between the resin to become a base material and particles are preferably carried out on an in-line basis in the case of injection molding of optical elements. In other words, it is preferable that an optical element (lens) is neither cooled nor solidified until it is molded, after mixing and dispersion.

Further, a volume ratio of resin to particle is preferably 9:1 to 3:2, whereby, there is obtained a material whose rate of change of the refractive index caused by temperature changes is small without deteriorating moldability of resin.

The objective lens described in Item 18 is represented by the structure according to any one of Items 1-15, wherein the objective lens is made of low-melting point glass whose glass transition point Tg is not more than 400° C.

When the low-melting point glass of this kind is used, a long life of a molding die is achieved, and a diffractive structure can be transferred properly through molding, because viscosity in the melted state is low. As a low-melting point glass having glass transition point Tg of not more than 400° C., K-PG325 and K-PG375 both made by Sumita Optical Glass, Inc. are available.

The objective lens described in Item 19 is represented by the structure according to any one of Items 1-18 wherein the following expressions are satisfied when m1 represents the first design magnification for the first wavelength $\lambda 1$, m2 represents the second design magnification for the second wavelength $\lambda 2$ and m3 represents the third design magnification for the third wavelength $\lambda 3$.

$$m1=m2=0 \tag{2}$$

$$-0.07 \leq m3 \leq 0 \tag{3}.$$

By satisfying the aforesaid expressions (2) and (3), comatic aberration generated by tracking drive in the case of conducting recording and reproducing for the first and second optical information recording media can be made zero, and spherical aberration for the third light flux can be corrected satisfactorily. In the objective lens of the invention, the diffracted light of the same order number is utilized for the first wavelength $\lambda 1$ and for the third wavelength $\lambda 3$ for compatibility of the first optical information recording medium and the third optical information recording medium, and therefore, the magnification in the case of using the third optical information recording medium can be kept within a range of the expression (3), thus, an amount of generation of comatic aberration in the case of tracking drive for the objective lens is small, and excellent tracking characteristics can be obtained.

The objective lens described in Item 20 is represented by the structure according to any one of Items 1-19, wherein the following expression is satisfied when ST represents the sum of areas for the central area and for the peripheral area and SC represents an area of the central area.

$$SC/ST<0.5 \tag{4}$$

If the expression (4) is satisfied, even when a great importance of the diffraction efficiency of the central area is attached to each of light fluxes respectively with wavelengths $\lambda 2$ and $\lambda 3$ (e.g., red, infrared), the diffraction efficiency of the light flux with wavelength $\lambda 1$ (e.g., blue) calculated by an area weighted average of each area can be secured to be high.

The optical pickup apparatus described in Item 21 is an optical pickup apparatus, provided with: a first light source for emitting a first light flux with a wavelength λ1 for recording and/or reproducing information on a first optical information recording medium having a protective substrate with a thickness t1; a second light source for emitting a second light flux with a wavelength λ2 (1.5×λ1λ2≦1.5×λ1) for recording and/or reproducing information on a second optical information recording medium having a protective substrate with a thickness t2 (t1≦t2); a third light source for emitting a third light flux (1.9×λ1<λ3<2.1×λ1) for recording and/or reproducing information on a third optical information recording medium having a protective substrate with a thickness t3 (t2<t3); and the objective lens described in any one of Items 1-20 for converging the first to third light fluxes on the information recording surfaces of the first to third optical information recording media, respectively.

The optical disc driving apparatus described in Item 22 is an optical disc driving apparatus, provided with: the optical pickup apparatus of Item 21; and a moving unit for moving the optical pickup apparatus in a radius direction of each of the first to third optical information recording media.

In the present specification, the objective lens is a lens having a light-converging function arranged at the position closest to the optical information recording medium to face it, under the condition that the optical information recording medium is loaded in the optical pickup apparatus.

While the preferred embodiments of the present invention have been described using specific terms, such description is for illustrative purposes only, and it is to be understood that changes and variations may be made without departing from the sprit or scope of the appended claims.

EXAMPLES

An embodiment of the invention will be explained as follows, referring to the drawings. First, an optical pickup apparatus relating to the embodiment of the invention will be explained by referring to FIG. 1. Meanwhile, optical pickup apparatus PU1 relating to the present embodiment can be incorporated in the optical disc driving apparatus.

FIG. 1 is a diagram showing schematically the structure of optical pickup apparatus PU1 capable of conducting recording and reproducing of information properly even for any of high density optical disc BD, DVD and CD. Optical specifications of BD include wavelength λ1=408 nm, thickness t1=0.1 mm for the first protective substrate PL1 and numerical aperture NA1=0.85, optical specifications of DVD include wavelength λ2=658 nm, thickness t2=0.6 mm for the second protective substrate PL2 and numerical aperture NA2=0.65, and optical specifications of CD include wavelength λ3=785 nm, thickness t3=1.2 mm for the third protective substrate PL3 and numerical aperture NA3=0.45. However, a combination of the wavelength, a thickness of the protective substrate and the numerical aperture is not limited to the foregoing.

Optical pickup apparatus PU1 is composed of violet semiconductor laser LD (first light source) that emits light when conducting recording and reproducing of information for BD and emits violet laser light flux (first light flux) with wavelength 408 nm, light source module LM composed of second light-emitting point EP1 (second light source) that emits light when conducting recording and reproducing of information for DVD and emits laser light flux (second light flux) with wavelength 658 nm, second light-emitting point EP2 (third light source) that emits light when conducting recording and reproducing of information for CD and emits laser light flux (third light flux) with wavelength 785 nm, first light-receiving section DS1 that receives a light flux reflected from information recording surface RL2 of DVD, second light-receiving section DS2 that receives a light flux reflected from information recording surface RL3 of CD, and of prism PS, photodetect or PD for BD, resin objective lens OL of a single lens structure wherein an optical surface closer to a light source is divided into three areas including a central area including an optical axis, a first peripheral area that surrounds the central area and a second peripheral area that surrounds the first peripheral area, and a first diffractive structure is formed on the central area, a second diffractive structure is formed on the first peripheral area and the second peripheral area is an aspheric surface where no diffractive structure is formed, and a third diffractive structure is formed on an optical surface closer to an optical information recording medium, biaxial actuator AC1, beam expander EXP that is composed of uniaxial actuator AC2, first lens L1 capable of traveling from the uniaxial actuator AC2 in the optical axis direction and of second lens L2, first polarized beam splitter BS1, second polarized beam splitter BS2 quarter wavelength plate QWP, sensor lens SEN for adding astigmatism to reflected light flux coming from information recording surface RL1, first collimator COL1 that is arranged in an exclusive optical path through which the first light flux only passes and converts the first light flux into a collimated light flux and second collimator COL2 that converts the second and third light fluxes into a collimated light flux. Incidentally, as a light source for BD, a violet SHG laser may also be used in addition to the aforesaid violet semiconductor laser LD1.

When conducting recording and reproducing of information for BD in optical pickup apparatus PU1, violet semiconductor laser is caused to emit light after adjusting the position of the first lens L1 in the optical axis direction by uniaxial actuator AC2 so that the first light flux may be emitted from beam expander EXP in the state of a collimated light flux. A divergent light flux emitted from violet semiconductor laser LD1 is reflected by first polarized beam splitter BS1 as its light path is drawn with solid lines in FIG. 1, then, is converted into a collimated light flux by a collimator, and is expanded in terms of a diameter by beam expander EXP to pass through quarter wavelength plate QWP to be regulated by an unillustrated aperture in terms of a diameter of the light flux, and enters objective lens OL under the circumstances of a collimated light to become a spot formed on information recording surface RL1 through protective substrate PL1 of BD. In this case, light fluxes passing through the central area, the first peripheral area and the second peripheral area of the objective lens and through the optical surface of the objective lens closer to the optical information recording medium form a light-convergent spot on information recording surface RL1 of BD. The objective lens OL is subjected to focusing and tracking conducted by biaxial actuator AC1 arranged around the objective lens OL.

The reflected light flux modulated by information pits on the information recording surface RL1 is transmitted again through objective lens OL, quarter wavelength plate QWP, beam expander EXP and second polarized beam splitter BS2, to be converted into a converged light flux by the first collimator COL1, and it is given astigmatism by sensor lens SEN after being transmitted through the first polarized beam splitter BS1, to be converged on the light-receiving surface of photodetector PD. Thus, information recorded on BD can be read by the use of output signals from the photodetector PD.

When conducting recording and reproducing of information for DVD in optical pickup apparatus PU1, first light-emitting point EP1 is caused to emit light after adjusting the position of the first lens L1 in the optical axis direction by uniaxial actuator AC2 so that the second light flux may be emitted from beam expander EXP under the circumstances of a collimated light flux. A divergent light flux emitted from the first light-emitting point EP1 is reflected by prism PS as its light path is drawn with broken lines in FIG. 1, then, is converted into a collimated light flux by second collimator COL2. After that, the light flux is reflected by second polarized beam splitter BS2 and is expanded in terms of a diameter by beam expander EXP to pass through quarter wavelength plate QWP, and enters objective lens OL under the circumstances of a collimated light to become a spot formed on information recording surface RL2 through protective substrate PL2 of DVD. In this case, light fluxes passing through the central area and the first peripheral area of the objective lens and through the optical surface of the objective lens closer to the optical information recording medium form a light-converged spot on information recording surface RL2 of DVD. The objective lens OL is subjected to focusing and tracking conducted by biaxial actuator AC1 arranged around the objective lens OL.

The reflected light flux modulated by information pits on the information recording surface RL2 is transmitted again through objective lens OL, quarter wavelength plate QWP and beam expander EXP, and then, is reflected by the second polarized beam splitter BS2 to be converted into a converged light flux by collimator COL2. After that, the converged light flux is reflected twice in the prism, to be converged on the first light-receiving section DS1. Thus, information recorded on DVD can be read by the use of output signals coming from the first light-receiving section DS1.

When conducting recording and reproducing of information for CD in optical pickup apparatus PU1, second light-emitting point EP2 is caused to emit light after adjusting the position of the first lens L1 in the optical axis direction by uniaxial actuator AC2 so that the third light flux may be emitted from beam expander EXP under the circumstances of a slightly divergent light flux. A divergent light flux emitted from the second light-emitting point EP2 is reflected by prism PS as its light path is drawn with one-dot chain lines in FIG. 1, then, is converted into a collimated light flux by second collimator COL2. After that, the light flux is reflected by second polarized beam splitter BS2 and is expanded in terms of a diameter by beam expander EXP to pass through quarter wavelength plate QWP, and enters objective lens OL under the circumstances of a collimated light or a slightly finite divergent light to become a spot formed on information recording surface RL3 through protective substrate PL3 of CD. In this case, light fluxes passing through the central area and the optical surface of the objective lens closer to the optical information recording medium form a light-converged spot on information recording surface RL3 of CD. The objective lens OL is subjected to focusing and tracking conducted by biaxial actuator AC1 arranged around the objective lens OL.

The reflected light flux modulated by information pits on the information recording surface RL3 is transmitted again through objective lens OL, quarter wavelength plate QWP and beam expander EXP, and then, is reflected by the second polarized beam splitter BS2, to be converted into a converged light flux by collimator COL2. After that, the converged light flux is reflected twice in the prism, to be converged on the second light-receiving section DS2. Thus, information recorded on CD can be read by the use of output signals coming from the second light-receiving section DS2.

Figure 2:
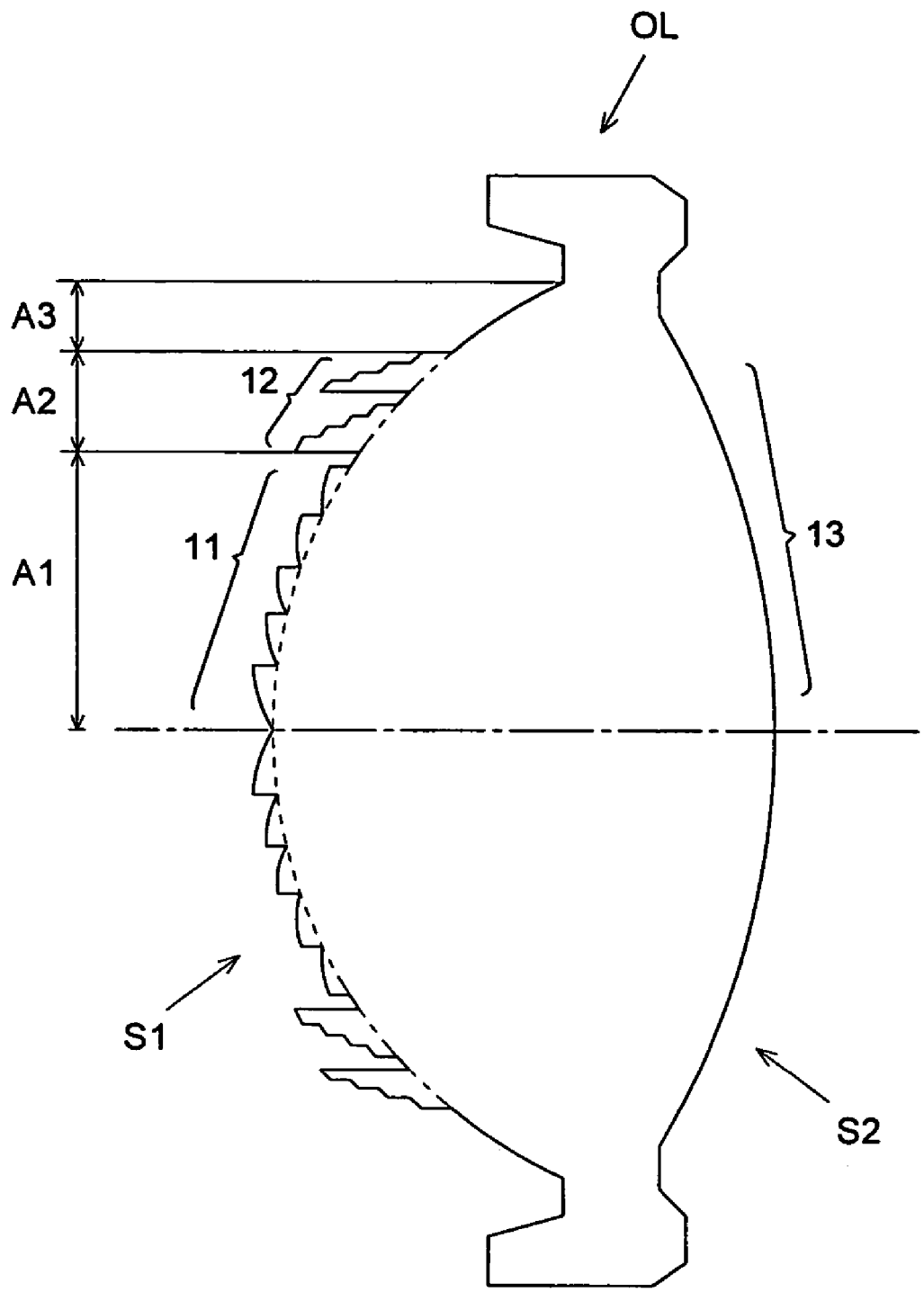
FIG. 2 is a diagram showing schematically the structure of objective lens OL.

Next, the structure of objective lens OL will be explained by using FIG. 2. An optical surface S1 of the objective lens OL closer to a light source is divided into three areas including a central area A1 including an optical axis, a first peripheral area A2 that surrounds the central area A1 and a second peripheral area A3 that surrounds the first peripheral area A2, as stated above, and a first diffractive structure 11 is formed on the central area A1, a second diffractive structure 12 is formed on the first peripheral area A2 and the second peripheral area A3 is an aspheric surface where no diffractive structure is formed. A form of the aspheric surface on the central area A1 and a form of the first diffractive structure A2 are determined so that first order diffracted lights of the first—third light fluxes may be converged respectively on information recording surfaces of respective optical information recording media. Since the magnification in the case of using CD has been made not to be too small by attaining compatibility for BD and CD by using the first order diffracted light, excellent tracking characteristics have been obtained. Further, since a depth of the ring-shaped zone of the first diffractive structure 11 is determined so that the diffraction efficiency of the second light flux may be 91% and that of the third light flux may be 72%, recording and reproducing at high speed for DVD and CD are made possible.

Further, a form of the aspheric surface on the first peripheral area A2 and a form of the second diffractive structure 12 (a diffractive structure of a wavelength-selective type in the present embodiment) are determined so that 0-order diffracted light (transmitted light) of the first light flux may be converged on an information recording surface of the optical information recording medium BD, and the first order diffracted light (transmitted light) of the second light flux may be converged on an information recording surface of the optical information recording medium DVD. With respect to diffraction efficiencies of the second diffractive structure 12 for respective light fluxes, the diffraction efficiency for the first light flux is 100%, and that for the second light flux is 88%, which means that the diffraction efficiencies (transmittance) which are high enough are obtained for all light fluxes.

Further, a form of the aspheric surface on the second peripheral area A3 is determined so that the first light flux may be converged on an information recording surface of the optical information recording medium BD. In the objective lens of the present embodiment, vignetting of the light flux caused by a difference in level of the ring-shaped zones is prevented, and transmittance of the first light flux is improved, by forming no diffractive structure on the second peripheral area.

Meanwhile, in the central area, the diffraction efficiency for the first light flux is 60% because of the design for the area wherein a great importance is attached to the diffraction efficiency for each of the second light flux and the third light flux. However, the diffraction efficiency of the first light flux calculated through the area weighted average of each area becomes 86% and recording and reproducing at high speed for BD are made possible, by making the diffraction efficiency (transmittance) of the second diffractive structure 12 for the first light flux to be 100% (namely, the expression (1) is satisfied), and by making the second peripheral area to be an aspheric surface on which no diffractive structure is formed.

Further, on the optical surface S2 closer to an optical information recording medium, there is formed the third diffractive structure 13. This third diffractive structure 13 is a structure to compensate for fluctuations of spherical aberration caused by temperature changes, and it has dependence on spherical aberration that changes toward insufficient correction when a wavelength of an incident light flux becomes longer.

In the objective lens of the present embodiment, the first diffractive structure 11 is designed to attach a great importance to the diffraction efficiency for each of the second light flux and the third light flux. However, a design to attach a great importance to the diffraction efficiency of the first light flux also works, and it is possible to establish properly depending on how the optical pickup apparatus is used.

In the objective lens of the present embodiment, the second diffractive structure 12 is designed to be a diffractive structure of a wavelength-selective type. However, the diffractive structure may also be of a blaze type that generates the second order diffracted light for the first light flux and the first order diffracted light is generated for the second light flux.

Further, in the objective lens of the present embodiment, there is employed a structure wherein fluctuations of spherical aberration caused by temperature changes are compensated by the third diffractive structure 13. However, it is also possible to employ the structure wherein fluctuations of paraxial image point caused by wavelength changes of the first light flux, and fluctuations of spherical aberration caused by wavelength changes of the first light flux are compensated.

In the structure of the objective lens of the present embodiment, spherical aberration caused by a thickness difference between the first protective substrate and the second protective substrate is corrected only in a range of the central area A1 and the first peripheral area A2, and is not corrected in the second peripheral areas A3. The second light flux passing through the second peripheral area becomes flare components on an information recording surface of DVD, whereby, an aperture restriction for DVD is carried out automatically.

In the structure of the objective lens of the present embodiment, spherical aberration caused by a thickness difference between the first protective substrate and the third protective substrate is corrected only in a range of the central area, and is not corrected in the first and second peripheral areas. The third light flux passing through the first and second peripheral areas becomes flare components on an information recording surface of CD, whereby, an aperture restriction for CD is carried out automatically.

Incidentally, a spot formed on information recording surface RL1 of BD can be corrected when the first lens L1 of beam expander EXP is driven by uniaxial actuator AC2 in the direction of an optical axis. Causes for generation of spherical aberration to be corrected by position adjustment of the first lens L1 include, for example, wavelength fluctuations caused by manufacturing errors of the first light source LD, changes and distribution of refractive index of the objective lens caused by temperature changes, focus jump between information recording layers of multi-layer disc such as 2-layer disc and 4-layer disc and thickness fluctuations and thickness distribution caused by manufacturing errors of protective layers of BD.

In the present embodiment, there is employed laser module LM wherein first light-emitting point EP1 and second light-emitting point EP2 are formed on the same chip. However, a light source module for BD, DVD and CD wherein a light-emitting point emitting a laser light flux with wavelength 408 nm for BD is also formed on the aforesaid same chip may also be used, without being limited to the foregoing. Or, a light source unit for BD, DVD and CD wherein three light sources of a violet semiconductor laser, a red semiconductor laser and an infrared semiconductor laser are housed in one casing may also be used.

In the structure of the present embodiment, a light source and photodetector PD are arranged to be separate from each other. Without being limited to this, a light source module in which a light source and a photodetector are integrated together can also be used.

Example 1

Next, Examples will be explained. Example 1 is an objective lens that is made of resin and is suitable for an optical pickup apparatus shown in FIG. 1. The objective lens in Example 1 is one wherein its optical surface closer to a light source is divided into three areas including a second surface including an optical axis (central area), $2'^{th}$ surface surrounding the second surface (first peripheral area) and $2''^{th}$ surface surrounding further the $2'^{th}$ surface (second peripheral area). In this case, a diffractive structure of blaze wavelength 550 nm (first diffractive structure) is formed on the second surface, and its diffraction order number is first order for BD, first order for DVD and first order for CD, and its diffraction efficiency is $(\eta 11=)$ 60% for BD, 91% for DVD and 72% for CD. Further, on the $2'^{th}$ surface, there is formed a diffractive structure of a wavelength-selective type having the wavelength-selectivity for diffracting operations to diffract only DVD without diffracting BD and CD. In the structure, a difference in level corresponding to one step is established to a depth corresponding to a double of a wavelength of the first light flux in a conversion into an optical path difference, the number of level surfaces formed in each pattern is 5, and steps are shifted by a height of four steps corresponding to the number 5 of the level surfaces. Since the refractive index of the objective lens for the first light flux is 1.5609, step $\Delta 1$ for one step is $\Delta 1 = 2 \times 0.408/(1.5609-1) = 1.455$ μm. Since optical path difference L added to the first light flux by the step $\Delta 1$ is double the first wavelength $\lambda 1$, the first light flux is transmitted as it is without being affected by the diffractive structure of a wavelength-selective type. Further, since the refractive index of the objective lens for the third light flux is 1.5384, optical path difference M added to the third light flux by the step $\Delta 1$ satisfies $M = 1.455 \times (1.5384-1)/0.785 = 0.998$, which is substantially the unchanged quantity of a wavelength of the third light flux, thus, the third light flux is also transmitted as it is without being affected by the diffractive structure of a wavelength-selective type. On the other hand, since the refractive index of the objective lens for the second light flux is 1.5420, optical path difference N added to the second light flux by the step $\Delta 1$ satisfies $N = 1.455 \times (1.5420-1)/0.658 = 1.198$, thus, a phase difference of the second light flux passing through the level surfaces before and after the step $\Delta 1$ (phase difference obtained by deducting a portion of a multiple of an integer of $2\pi$ which corresponds optically to equiphase) is $2\pi \times 0.198$. Since the number of level surfaces in one pattern is 5, the phase difference of the second light flux becomes $5 \times 2\pi \times 0.198 = 2\pi$ exactly for one pattern, and the first order diffracted light is generated. The diffraction efficiencies are respectively $(\eta 21=)$ 100% for BD, 88% for DVD and 100% for CD. Further, $2''^{th}$ surface is in a form of an aspheric surface. On the other hand, on the optical surface closer to an optical disc (third surface), there is formed a diffractive structure with blaze wavelength 408 nm (third diffractive structure), and its diffraction order number is $10^{th}$ order for BD, $6^{th}$ order for DVD and $5^{th}$ order for CD, and its diffraction efficiency is 100% for BD, 100% for DVD and 100% for CD. In the objective lens in the Example 1, a spherical aberration change caused by a temperature change of +30° C. is 0.006 λRMS (0.168 λRMS in the case when no diffractive structure is formed on the third surface), and the total diffraction efficiency is 86% for BD, 89% for DVD and 72% for CD. Incidentally, in the objective lens in the present example, a ratio of SC representing an area of the central area to ST representing the sum of the areas of the central area, the first peripheral area and the second peripheral area is 0.33.

Lens data in the Example 1 (including a focal length, a numerical aperture on the image surface side and a magnification) are shown in Table 1. Meanwhile, let it be assumed that an exponent of 10 (e.g., $2.5 \times 10^{-3}$) is expressed by E (e.g., 2.5 E-3), hereafter (including lens data on the Table).

TABLE 1

Example 1 Lens Data

| | | | | | | | |
|---|---|---|---|---|---|---|---|
| Focal length of objective lens | | $f_1$ = 2.19 mm | | $f_2$ = 2.26 mm | | $f_3$ = 2.28 mm | |
| Numerical aperture | | NA1: 0.85 | | NA2: 0.66 | | NA3: 0.46 | |
| Magnification | | m1: 0 | | m2: 0 | | m3: −0.0426 | |
| $i^{th}$ surface | $r_i$ | $d_i$ (408 nm) | $n_i$ (408 nm) | $d_i$ (658 nm) | $n_i$ (658 nm) | $d_i$ (785 nm) | $n_i$ (785 nm) |
| 0 | | ∞ | | ∞ | | 55.000 | |
| 1 (Aperture diameter) | | 0.0 (φ3.74 mm) | | 0.0 (φ2.94 mm) | | 0.0 (φ2.14 mm) | |
| 2 | 1.4707 | 2.680 | 1.5609 | 2.680 | 1.5420 | 2.680 | 1.5384 |
| 2' | 1.4960 | 0.000 | | 0.000 | | 0.000 | |
| 2" | 1.4909 | 0.000 | | 0.000 | | 0.000 | |
| 3 | −3.2474 | 0.726 | 1.0000 | 0.475 | 1.0000 | 0.211 | 1.0000 |
| 4 | ∞ | 0.0875 | 1.6184 | 0.6 | 1.5773 | 1.2 | 1.5709 |
| 5 | ∞ | | | | | | |

*The symbol 2' shows a displacement from the second surface to the $2'^{th}$ surface.
*The symbol 2" shows a displacement from the $2'^{th}$ surface to the $2''^{th}$ surface.

Second surface (0 mm ≦ h ≦ 1.100 mm)
Aspheric surface coefficient

| | |
|---|---|
| κ | −7.0427E−01 |
| A4 | 7.4223E−03 |
| A6 | −2.0190E−03 |
| A8 | 2.4523E−03 |
| A10 | −7.3015E−04 |
| A12 | −7.0596E−05 |
| A14 | 2.3442E−04 |
| A16 | −1.6860E−04 |
| A18 | 4.4733E−05 |
| A20 | −4.4186E−06 |

Optical path difference function (BD: $1^{st}$ order, DVD: $1^{st}$ order, CD: $1^{st}$ order, manufacture wavelength 550 nm)

| | |
|---|---|
| C1 | 4.4371E−03 |
| C2 | −1.6945E−03 |
| C3 | −1.2404E−03 |
| C4 | 9.2878E−04 |
| C5 | −2.8718E−04 |

$2'^{th}$ surface (1.100 mm ≦ h ≦ 1.500 mm)
Aspheric surface coefficient

| | |
|---|---|
| κ | −6.6076E−01 |
| A4 | 8.3930E−03 |
| A6 | −1.6207E−03 |
| A8 | 2.8973E−03 |
| A10 | −1.4248E−03 |
| A12 | 2.2893E−04 |
| A14 | 2.2358E−04 |
| A16 | −1.6524E−04 |
| A18 | 4.8206E−05 |
| A20 | −5.4013E−06 |

Optical path difference function (BD: $0^{th}$ order, DVD: $1^{st}$ order, CD: $0^{th}$ order, manufacture wavelength 658 nm)

| | |
|---|---|
| C1 | 2.6114E−03 |
| C2 | −2.0837E−03 |
| C3 | 8.4202E−04 |
| C4 | −3.8289E−04 |
| C5 | 4.0704E−05 |

$2''^{th}$ surface (1.500 mm < h)
Aspheric surface coefficient

| | |
|---|---|
| κ | −6.5972E−01 |
| A4 | 7.8024E−03 |
| A6 | −1.9518E−03 |
| A8 | 2.8832E−03 |
| A10 | −1.3937E−03 |

TABLE 1-continued

Example 1 Lens Data

| | |
|---|---|
| A12 | 2.5822E−04 |
| A14 | 2.3117E−04 |
| A16 | −1.7041E−04 |
| A18 | 4.4885E−05 |
| A20 | −4.2425E−06 |

Third surface
Aspheric surface coefficient

| | |
|---|---|
| κ | −8.0855E+01 |
| A4 | 1.3795E−01 |
| A6 | −1.0111E−01 |
| A8 | 7.2824E−02 |
| A10 | −4.4906E−02 |
| A12 | 1.3758E−02 |
| A14 | −1.4902E−03 |

Optical path difference function (BD: $10^{th}$ order, DVD: $6^{th}$ order, CD: $5^{th}$ order, manufacture wavelength 408 nm)

| | |
|---|---|
| C1 | −2.8868E−03 |
| C2 | −3.5861E−03 |
| C3 | 6.5773E−04 |
| C4 | 5.3262E−04 |
| C5 | −1.2290E−04 |

The optical surface of the objective lens is formed to be an aspheric surface that is prescribed by the numerical expression in which a coefficient shown in Table 1 is substituted in Numeral 1, and is axially symmetrical about the optical axis.

$$X(h) = \frac{(h^2/r)}{1+\sqrt{1-(1+\kappa)(h/r)^2}} + \sum_{i=0}^{10} A_{2i} h^{2i} \quad \text{(Numeral 1)}$$

In the Numeral 1 above, X(h) represents an axis (light traveling direction is positive) in the direction of an optical axis, κ represents a conic constant, $A_{2i}$ represents an aspheric surface coefficient and h represents a height from the optical axis.

An optical path length given to a light flux with each wavelength by the diffractive structure is prescribed by the numerical expression in which a coefficient shown in Table 1 is substituted for an optical path difference function of Numeral 2.

$$\Phi(h) = \lambda/\lambda_B \times dor \times \sum_{i=0}^{5} C_{2i} h^{2i} \quad \text{(Numeral 2)}$$

In the Numeral 2 above, λ represents a wavelength of an incident light flux, λB represents a manufacture wavelength (blaze wavelength), dor represents a diffraction order number and $C_{2i}$ represents a coefficient of an optical path difference function.

Example 2

Example 2 is for the objective lens made of resin which is suitable for the optical pickup apparatus shown in FIG. 1. In the objective lens in Example 2, an optical surface closer to a light source is divided into three areas including the second surface including an optical axis (central area), $2'^{th}$ surface (first peripheral area) surrounding the second surface and $2''^{th}$ surface (second peripheral area) which further surrounds the $2'^{th}$ surface. In this case, a diffractive structure of blaze wavelength 450 nm (first diffractive structure) is formed on the second surface, and its diffraction order number is a first order for BD, a first order for DVD and a first order for CD, and its diffraction efficiency is (η11=) 96% for BD, 69% for DVD and 50% for CD. Further, on the $2'^{th}$ surface, there is formed a diffractive structure of a wavelength-selective type having the wavelength-selectivity for diffracting operations to diffract only DVD without diffracting BD and CD. In the structure, a difference in level corresponding to one step is established to a depth 1.455 μm corresponding to a double of a wavelength of the first light flux in a conversion into an optical path difference, the number of level surfaces formed in each pattern is 5, and steps are shifted by a height of four steps corresponding to five level surfaces. In the diffractive structure of a wavelength-selective type mentioned above, no diffraction is conducted for BD and CD ($0^{th}$ order light) and the first order diffracted light is generated for DVD. The diffraction efficiencies are respectively (η21=) 100% for BD, 88% for DVD and 100% for CD. Further, the $2''^{th}$ surface is in a form of an aspheric surface. On the other hand, a diffractive structure of blaze wavelength 408 nm (third diffractive structure) is formed on the optical surface closer to an optical disc (third surface), and its diffraction order number is a $10^{th}$ order for BD, a $6^{th}$ order for DVD and a $5^{th}$ order for CD, and its diffraction efficiency is 100% for BD, 100% for DVD and 100% for CD. In the objective lens of this kind in Example 2, a spherical aberration change caused by wavelength shift of +5 nm is 0.014 λRMS (0.057 λRMS when no diffractive structure is given to the third surface), and the total diffraction efficiency is 99% for BD, 77% for DVD and 50% for CD. Meanwhile, in the objective lens of the present example, a ratio of SC/ST wherein ST represents the sum of the central area, the first peripheral area and the second peripheral area and SC represents an area of the central area, is 0.33.

Lens data (including a focal length, a numerical aperture and a magnification) of Example 2 are shown in Table 2.

TABLE 2

Example 2 Lens Data

| | | | | | | |
|---|---|---|---|---|---|---|
| Focal length of objective lens | | $f_1$ = 2.19 mm | | $f_2$ = 2.27 mm | | $f_3$ = 2.29 mm |
| Numerical aperture | | NA1: 0.85 | | NA2: 0.66 | | NA3: 0.46 |
| Magnification | | m1: 0 | | m2: 0 | | m3: −0.0428 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | | ∞ | | ∞ | | 55.000 | |
| 1 (Aperture diameter) | | 0.0 (φ3.74 mm) | | 0.0 (φ2.94 mm) | | 0.0 (φ2.14 mm) | |
| 2 | 1.4286 | 2.680 | 1.5609 | 2.680 | 1.5420 | 2.680 | 1.5384 |
| 2' | 1.4593 | 0.000 | | 0.000 | | 0.000 | |
| 2'' | 1.4617 | 0.000 | | 0.000 | | 0.000 | |
| 3 | −2.2243 | 0.688 | 1.0000 | 0.441 | 1.0000 | 0.180 | 1.0000 |
| 4 | ∞ | 0.0875 | 1.6184 | 0.6 | 1.5773 | 1.2 | 1.5709 |
| 5 | ∞ | | | | | | |

*The symbol 2' shows a displacement from the second surface to the $2'^{th}$ surface.
*The symbol $2''^{th}$ shows a displacement from the $2'^{th}$ surface to the $2''^{th}$ surface.

Second surface (0 mm ≦ h ≦ 1.100 mm)
Aspheric surface coefficient

| | |
|---|---|
| κ | −7.0134E−01 |
| A4 | 7.0920E−03 |
| A6 | 1.4253E−05 |
| A8 | 9.0832E−04 |
| A10 | −1.7105E−04 |
| A12 | −7.0596E−05 |
| A14 | 2.3442E−04 |
| A16 | −1.6860E−04 |
| A18 | 4.4733E−05 |
| A20 | −4.4166E−06 |

Optical path difference function (BD: $1^{st}$ order, DVD: $1^{st}$ order, CD: $1^{st}$ order, manufacture wavelength 450 nm)

| | |
|---|---|
| C1 | 4.2034E−03 |
| C2 | −1.6294E−03 |
| C3 | −3.4770E−04 |
| C4 | 5.5174E−05 |
| C5 | 1.1691E−05 |

$2'^{th}$ surface (1.100 mm ≦ h ≦ 1.500 mm)
Aspheric surface coefficient

| | |
|---|---|
| κ | −6.4991E−01 |
| A4 | 9.5889E−03 |
| A6 | −1.8587E−03 |
| A8 | 2.8967E−03 |
| A10 | −1.3809E−03 |
| A12 | 2.6008E−04 |
| A14 | 2.2946E−04 |
| A16 | −1.7007E−04 |
| A18 | 4.4481E−05 |
| A20 | −4.0742E−06 |

Optical path difference function (BD: $0^{th}$ order, DVD: $1^{st}$ order, CD: $0^{th}$ order, manufacture wavelength 658 nm)

| | |
|---|---|
| C1 | 2.8479E−03 |
| C2 | −1.9011E−03 |
| C3 | 6.8280E−04 |
| C4 | −3.2458E−04 |
| C5 | 3.2276E−05 |

$2''^{th}$ surface (1.500 mm < h)
Aspheric surface coefficient

| | |
|---|---|
| κ | −6.4595E−01 |
| A4 | 9.9369E−03 |
| A6 | −1.8594E−03 |
| A8 | 2.8418E−03 |
| A10 | −1.3971E−03 |
| A12 | 2.6228E−04 |
| A14 | 2.3303E−04 |
| A16 | −1.6966E−04 |
| A18 | 4.4655E−05 |
| A20 | −4.2998E−06 |

TABLE 2-continued

Example 2 Lens Data

Third surface
Aspheric surface coefficient

| | |
|---|---|
| κ | −3.0729E+01 |
| A4 | 1.1013E−01 |
| A6 | −9.7440E−02 |
| A8 | 7.5519E−02 |
| A10 | −4.3741E−02 |
| A12 | 1.3990E−02 |
| A14 | −1.8474E−03 |

Optical path difference function (BD: $10^{th}$ order, DVD: $6^{th}$ order, CD: $5^{th}$ order, manufacture wavelength 408 nm)

| | |
|---|---|
| C1 | 2.0845E−03 |
| C2 | −2.1074E−03 |
| C3 | 5.5686E−04 |
| C4 | −2.4506E−05 |
| C5 | 1.1668E−05 |

Example 3

Example 3 is for the objective lens made of resin which is suitable for the optical pickup apparatus shown in FIG. 1. In the objective lens in Example 3, an optical surface closer to a light source is divided into three areas including the second surface including an optical axis (central area), $2'^{th}$ surface (first peripheral area) surrounding the second surface and $2''^{th}$ surface (second peripheral area) which further surrounds the $2'^{th}$ surface. In this case, a diffractive structure of blaze wavelength 550 nm (first diffractive structure) is formed on the second surface, and its diffraction order number is a first order for BD, a first order for DVD and a first order for CD, and its diffraction efficiency is (η11=) 60% for BD, 91% for DVD and 72% for CD. Further, a diffractive structure of blaze wavelength 395 nm (second diffractive structure) is formed on the $2'^{th}$ surface, and its diffraction order number is a second order for BD, a first order for DVD (and a first order for CD), and its diffraction efficiency is (η21=) 98% for BD, 92% for DVD (and 100% for CD). Further, the $2''^{th}$ surface is in a form of an aspheric surface. On the other hand, a diffractive structure of blaze wavelength 408 nm (third diffractive structure) is formed on the optical surface closer to an optical disc (third surface), and its diffraction order number is a $10^{th}$ order for BD, a $6^{th}$ order for DVD and a $5^{th}$ order for CD, and its diffraction efficiency is 100% for BD, 100% for DVD and 100% for CD. In the objective lens of this kind in Example 2, an amount of generation of defocus caused by wavelength shift of +5 nm is 0.043 λRMS (0.096 λRMS when no diffractive structure is given to the third surface), and the total diffraction efficiency is 86% for BD, 91% for DVD and 72% for CD. Meanwhile, in the objective lens of the present example, a ratio of SC/ST wherein ST represents the sum of the central area, the first peripheral area and the second peripheral area and SC represents an area of the central area, is 0.33.

Lens data (including a focal length, a numerical aperture and a magnification) of Example 3 are shown in Table 3.

TABLE 3

Example 3 Lens Data

| | | | | | | |
|---|---|---|---|---|---|---|
| Focal length of objective lens | | $f_1$ = 2.20 mm | | $f_2$ = 2.28 mm | | $f_3$ = 2.30 mm |
| Numerical aperture | | NA1: 0.85 | | NA2: 0.65 | | NA3: 0.46 |
| Magnification | | m1: 0 | | m2: 0 | | m3: −0.0429 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | ∞ | | | ∞ | | 55.000 | |
| 1 | 0.0 | | | 0.0 | | 0.0 | |
| (Aperture diameter) | | (φ3.74 mm) | | (φ2.92 mm) | | (φ2.14 mm) | |
| 2 | 1.4484 | 2.680 | 1.5609 | 2.680 | 1.5420 | 2.680 | 1.5384 |
| 2' | 1.5992 | 0.000 | | 0.000 | | 0.000 | |
| 2" | 1.4846 | 0.000 | | 0.000 | | 0.000 | |
| 3 | −3.4317 | 0.710 | 1.0000 | 0.466 | 1.0000 | 0.207 | 1.0000 |
| 4 | ∞ | 0.0875 | 1.6184 | 0.6 | 1.5773 | 1.2 | 1.5709 |
| 5 | ∞ | | | | | | |

*The symbol 2' shows a displacement from the second surface to the $2'^{th}$ surface.
*The symbol 2" shows a displacement from the $2'^{th}$ surface to the $2''^{th}$ surface.

Second surface (0 mm ≦ h ≦ 1.100 mm)
Aspheric surface coefficient

| | |
|---|---|
| κ | −6.9288E−01 |
| A4 | 1.0152E−02 |
| A6 | −4.8538E−03 |

TABLE 3-continued

Example 3 Lens Data

| | |
|---|---|
| A8 | 3.9584E−03 |
| A10 | −9.8134E−04 |
| A12 | −7.0596E−05 |
| A14 | 2.3442E−04 |
| A16 | −1.6860E−04 |
| A18 | 4.4733E−05 |
| A20 | −4.4166E−06 |

Optical path difference function (BD: $1^{st}$ order, DVD: $1^{st}$ order, CD: $1^{st}$ order, manufacture wavelength 550 nm)

| | |
|---|---|
| C1 | 5.1550E−03 |
| C2 | 1.9077E−04 |
| C3 | −3.3455E−03 |
| C4 | 1.9654E−03 |
| C5 | −4.9197E−04 |

$2'^{th}$ surface (1.100 mm $\leq$ h $\leq$ 1.500 mm)
Aspheric surface coefficient

| | |
|---|---|
| κ | −5.9613E−01 |
| A4 | 1.2496E−02 |
| A6 | 1.4801E−03 |
| A8 | 3.5195E−03 |
| A10 | −1.3432E−03 |
| A12 | 2.5269E−04 |
| A14 | 2.3449E−04 |
| A16 | −1.5798E−04 |
| A18 | 4.6523E−05 |
| A20 | −6.1623E−06 |

Optical path difference function (BD: $2^{nd}$ order, DVD: $1^{st}$ order, CD: $1^{st}$ order, manufacture wavelength 395 nm)

| | |
|---|---|
| C1 | −6.4521E−03 |
| C2 | 5.5565E−04 |
| C3 | 9.1363E−04 |
| C4 | 2.4706E−04 |
| C5 | −4.0088E−05 |

$2'''^{th}$ surface (1.500 mm < h)
Aspheric surface coefficient

| | |
|---|---|
| κ | −6.4628E−01 |
| A4 | 1.0155E−02 |
| A6 | −1.7509E−03 |
| A8 | 2.7930E−03 |
| A10 | −1.4184E−03 |
| A12 | 2.5914E−04 |
| A14 | 2.3395E−04 |
| A16 | −1.6915E−04 |
| A18 | 4.4715E−05 |
| A20 | −4.3843E−06 |

Third surface
Aspheric surface coefficient

| | |
|---|---|
| κ | −7.8822E+01 |
| A4 | 1.0232E−01 |
| A6 | −1.0022E−01 |
| A8 | 7.7291E−02 |
| A10 | −4.4312E−02 |
| A12 | 1.4066E−02 |
| A14 | −1.8746E−03 |

Optical path difference function (BD: $10^{th}$ order, DVD: $6^{th}$ order, CD: $5^{th}$ order, manufacture wavelength 408 nm)

| | |
|---|---|
| C1 | −2.6424E−03 |
| C2 | 1.3222E−04 |
| C3 | 4.2562E−05 |
| C4 | −6.5338E−05 |
| C5 | 5.9834E−05 |

The invention makes it possible to provide an objective lens that has a diffractive structure and is a single lens, capable of conducting recording and/or reproducing of information properly for three types of discs each having a different recording density, including a high density optical disc using a violet laser light source, DVD and CD, and in particular, an objective lens wherein an amount of generation of comatic aberration is sufficiently small when the objective lens is subject to tracking driving in the case of using CD, an optical pickup apparatus employing that objective lens and an optical disc driving apparatus.

What is claimed is:

1. An objective optical lens for use in an optical pickup apparatus for recording and/or reproducing information by converging a first light flux with a wavelength $\lambda 1$ ($\lambda 1 < 450$ nm) emitted by a first light source on an information recording surface of a first optical information recording medium through a first protective substrate with a thickness t1, for recording and/or reproducing information by converging a second light flux with a wavelength $\lambda 2$ ($1.5 \times \lambda 1 < \lambda 2 < 1.7 \times \lambda 1$) emitted by a second light source on an information recording surface of a second optical information recording medium through a second protective substrate with a thickness t2 ($t1 \leq t2$) and for recording and/or reproducing information by converging a third light flux with a wavelength $\lambda 3$ ($1.9 \times \lambda 1 < \lambda 3 < 2.1 \times \lambda 1$) emitted by the third light source on an information recording surface of a third optical information recording medium through a third protective substrate with a thickness t3 ($t2 < t3$), the objective optical lens comprising:

an optical surface divided into at least two areas including:

a central area including an optical axis and comprising a first diffractive structure; and a peripheral area surrounding the central area and comprising a second diffractive structure, the objective lens is a single lens and is commonly used for the first to third optical information recording media, the objective lens converges diffracted light fluxes of the first to third light fluxes generated in the first diffractive structure onto information recording surfaces of the first to third optical information recording media, respectively, the diffracted light fluxes of the first to third light fluxes generated in the first diffractive structure have same diffraction order as each other, and the objective lens converges diffracted light fluxes of the first and second light fluxes generated in the second diffractive structure onto information recording surfaces of the first and second optical information recording media, respectively, the diffracted light fluxes of the first and second light fluxes generated in the second diffractive structure have different diffraction order as each other, wherein the second diffractive structure is a wavelength selective diffractive structure comprising a plurality of patterns arranged concentrically, each of the plurality of patterns has a cross section including an optical axis in a stepped shape with a plurality of levels, each step of the stepped shape is shifted by height of steps corresponding to a predefined number of the plurality of levels for every predefined number of the levels, and the diffraction orders of the diffracted light fluxes of the first and second light fluxes generated in the second diffractive structure are 0 for the first light flux and 1 for the second light flux.

2. The objective optical lens of claim 1,
wherein the objective lens satisfies $\eta 11 \leq \eta 21$,
where $\eta 11$ is a diffraction efficiency of the first light flux in the central area and
$\eta 21$ is a diffraction efficiency of the first light flux in the peripheral area.

3. The objective lens of claim 1,
wherein the same diffraction order of the diffracted light fluxes of the first to third light fluxes generated in the first diffractive structure is 1.

4. The objective lens of claim 1,
wherein a diffractive power of the first diffractive structure is negative.

5. The objective lens of claim 1,
wherein one step of the plurality of patterns in the second diffractive structure provides an optical path difference to the first light flux with the first wavelength $\lambda 1$, and the optical path difference is twice of the first wavelength $\lambda 1$.

6. The objective lens of claim 1,
wherein the predefined number of the levels in the second diffractive structure is one of 4, 5 and 6.

7. The objective lens of claim 1,
wherein the peripheral area is divided into at least two areas including:
a first peripheral area surrounding the central area and including the second diffractive structure; and
a second peripheral area surrounding the first peripheral area and formed by an aspherical surface without the second diffractive structure.

8. The objective lens of claim 1,
wherein the objective lens is made of resin.

9. The objective lens of claim 1,
wherein the objective lens is made of a low melting point glass whose glass transition point is 400° C. or low.

10. The objective lens of claim 1,
wherein the objective lens satisfies following expressions:

$$m1 = m2 = 0$$

$$-0.06 \leq m3 \leq 0,$$

where m1 is a first design magnification for the first wavelength $\lambda 1$,
m2 is a second design magnification for the second wavelength $\lambda 2$, and
m3 is a third design magnification for the third wavelength $\lambda 3$.

11. The objective lens of claim 1,
wherein the objective lens satisfies a following expression:

$$SC/ST < 0.5,$$

where ST is sum of areas of the central area and the peripheral area, and
SC is an area of the central area.

12. An optical pickup apparatus, comprising:
a first light source for emitting a first light flux with a wavelength $\lambda 1$ for recording and/or reproducing information on a first optical information recording medium having a protective substrate with a thickness t1;
a second light source for emitting a second light flux with a wavelength $\lambda 2$ ($1.5 \times \lambda 1 < \lambda 2 < 1.7 \times \lambda 1$) for recording and/or reproducing information on a second optical information recording medium having a protective substrate with a thickness t2 ($t1 \leq t2$);
a third light source for emitting a third light flux ($1.9 \times \lambda 1 < \lambda 3 < 2.1 \times \lambda 1$) for recording and/or reproducing information on a third optical information recording medium having a protective substrate with a thickness t3 ($t2 < t3$); and
the objective lens of claim 1 for converging the first to third light fluxes on the information recording surfaces of the first to third optical information recording media, respectively.

13. An optical disc driving apparatus, comprising:
the optical pickup apparatus of claim 12; and
a moving unit for moving the optical pickup apparatus in a radius direction of each of the first to third optical information recording media.

14. An objective optical lens for use in an optical pickup apparatus for recording and/or reproducing information by converging a first light flux with a wavelength $\lambda 1$ ($\lambda 1 < 450$ nm) emitted by a first light source on an information recording surface of a first optical information recording medium through a first protective substrate with a thickness t1, for recording and/or reproducing information by converging a second light flux with a wavelength $\lambda 2$ ($1.5 \times \lambda 1 < \lambda 2 < 1.7 \times \lambda 1$) emitted by a second light source on an information recording surface of a second optical information recording medium through a second protective substrate with a thickness t2 ($t1 \leq t2$) and for recording and/or reproducing information by converging a third light flux with a wavelength $\lambda 3$ ($1.9 \times \lambda 1 < \lambda 3 < 2.1 \times \lambda 1$) emitted by the third light source on an information recording surface of a third optical information recording medium through a third protective substrate with a thickness t3 ($t2 < t3$), the objective optical lens comprising:

an optical surface divided into at least two areas including:

a central area including an optical axis and comprising a first diffractive structure; and a peripheral area surrounding the central area and comprising a second diffractive structure, the objective lens is a single lens and is commonly used for the first to third optical information recording media, the objective lens converges diffracted light fluxes of the first to third light fluxes generated in the first diffractive structure onto information recording surfaces of the first to third optical information recording media, respectively, the diffracted light fluxes of the first to third light fluxes generated in the first diffractive structure have same diffraction order as each other, and the objective lens converges diffracted light fluxes of the first and second light fluxes generated in the second diffractive structure onto information recording surfaces of the first and second optical information recording media, respectively, the diffracted light fluxes of the first and second light fluxes generated in the second diffractive structure have different diffraction order as each other, wherein the objective lens further comprises a third diffractive structure, wherein the objective lens converges a 10th diffracted light flux among diffracted light fluxes of the first light flux generated by the third diffractive structure on the information recording surface of the first optical information recording medium, converges a 6th diffracted light flux among diffracted light fluxes of the second light flux generated by the third diffractive structure on the information recording surface of the second optical information recording medium, and converges a 5th diffracted light flux among diffracted light fluxes of the third light flux generated by the third diffractive structure on the information recording surface of the third optical information recording medium.

15. The objective lens of claim 14, wherein the third diffractive structure compensates a deterioration of a paraxial image point position of the first light flux caused by a wavelength change of the first light flux in a range of $\pm -5$ nm.

16. The objective lens of claim 14, wherein the third diffractive structure compensates a deterioration of a spherical aberration of the first light flux caused by a wavelength change of the first light flux in a range of $\pm 5$ nm.

17. The objective lens of claim 14, wherein the third diffractive structure compensates a deterioration of a spherical aberration of the first light flux caused by a temperature change in a range of $\pm 30°$ C.

18. An optical pickup apparatus, comprising:

a first light source for emitting a first light flux with a wavelength $\lambda 1$ for recording and/or reproducing information on a first optical information recording medium having a protective substrate with a thickness t1;

a second light source for emitting a second light flux with a wavelength $\lambda 2$ ($1.5 \times \lambda 1 < \lambda 2 < 1.7 \times \lambda 1$) for recording and/or reproducing information on a second optical information recording medium having a second protective substrate with a thickness t2 ($t1 \leq t2$);

a third light source for emitting a third light flux ($1.9 \times \lambda 1 < \lambda 3 < 2.1 \times \lambda 1$) for recording and/or reproducing information on a third optical information recording medium having a protective substrate with a thickness t3 ($t2 < t3$); and the objective lens of claim 14 for converging the first to third light fluxes on the information recording surfaces of the first to third optical information recording media, respectively.

19. An optical disc driving apparatus, comprising:

the optical pickup apparatus of claim 18; and a moving unit for moving the optical pickup apparatus in a radius direction of each of the first to third optical information recording media.

* * * * *

UNITED STATES PATENT AND TRADEMARK OFFICE
CERTIFICATE OF CORRECTION

PATENT NO. : 7,623,434 B2 Page 1 of 1
APPLICATION NO. : 11/258280
DATED : November 24, 2009
INVENTOR(S) : Kimura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this

Fourteenth Day of December, 2010

David J. Kappos
*Director of the United States Patent and Trademark Office*